(12) United States Patent
Trentmann

(10) Patent No.: US 12,449,058 B2
(45) Date of Patent: Oct. 21, 2025

(54) METHOD FOR ACTUATING A SOLENOID VALVE WHICH IS USED FOR THROUGHFLOW RATE CONTROL OF AN AGRICULTURAL SPREADING MACHINE

(71) Applicant: Amazonen-Werke H. Dreyer SE & Co. KG, Hasbergen (DE)

(72) Inventor: Markus Trentmann, Wallenhorst (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 41 days.

(21) Appl. No.: 18/273,660

(22) PCT Filed: Jan. 20, 2022

(86) PCT No.: PCT/EP2022/051170
§ 371 (c)(1),
(2) Date: Jul. 21, 2023

(87) PCT Pub. No.: WO2022/157215
PCT Pub. Date: Jul. 28, 2022

(65) Prior Publication Data
US 2024/0084916 A1    Mar. 14, 2024

(30) Foreign Application Priority Data
Jan. 22, 2021    (DE) ............ 10 2021 101 335.6

(51) Int. Cl.
*F16K 31/06*    (2006.01)
*A01M 7/00*    (2006.01)
*H01F 7/18*    (2006.01)

(52) U.S. Cl.
CPC ....... *F16K 31/0675* (2013.01); *A01M 7/0089* (2013.01); *F16K 31/0655* (2013.01);
(Continued)

(58) Field of Classification Search
CPC ............ F16K 31/0675; F16K 31/0655; A01M 7/0089; H01F 2007/1888; H01F 2007/1894; H01F 7/1844
See application file for complete search history.

(56) References Cited

U.S. PATENT DOCUMENTS 4,726,389 A * 2/1988 Minoura ............. F02D 41/2096
239/585.4
6,056,000 A * 5/2000 Santacatterina .... F16K 31/0686
251/129.01
(Continued)

FOREIGN PATENT DOCUMENTS

DE        19908899 A1    6/2000
DE    102009000132 A1    7/2010
(Continued)

OTHER PUBLICATIONS

DE102010014825A1 Continental Automotive Gmbh, English translation of German patent published Oct. 23, 2011.*
(Continued)

*Primary Examiner* — Craig M Schneider
*Assistant Examiner* — Christopher D Ballman
(74) *Attorney, Agent, or Firm* — Potomac Law Group, PLLC; John (Jack) Penny; Reza Mollaaghababa

(57) ABSTRACT

A method for actuating a solenoid valve, which is used for throughflow rate control, of an agricultural spreading machine, wherein the solenoid valve has a valve armature, comprising: energizing the solenoid valve in order to cause an opening movement of the valve armature and/or in order to hold the valve armature in an open position in which the solenoid valve is open, interrupting or changing the energization of the solenoid valve in order to cause a closing movement of the valve armature in the direction of a valve seat, and causing a reduction in the movement speed of the (Continued)

valve armature during the closing movement of the valve armature.

12 Claims, 5 Drawing Sheets

(52) U.S. Cl.
CPC .... *H01F 7/1844* (2013.01); *H01F 2007/1888* (2013.01); *H01F 2007/1894* (2013.01)

(56) References Cited

U.S. PATENT DOCUMENTS

| | | | | |
|---|---|---|---|---|
| 6,737,946 | B2* | 5/2004 | Seale | F16K 31/0675 |
| | | | | 335/279 |
| 9,394,848 | B2* | 7/2016 | Puckett | F02M 51/0625 |
| 10,527,188 | B2* | 1/2020 | Hoeflinger | F16K 31/0655 |
| 10,655,583 | B2* | 5/2020 | Omekanda | F02D 41/402 |
| 10,711,913 | B2* | 7/2020 | Schneider | B24B 55/02 |
| 10,969,019 | B2* | 4/2021 | Yasuda | F16K 1/54 |
| 2022/0034420 | A1* | 2/2022 | Ott | F16K 31/0675 |

FOREIGN PATENT DOCUMENTS

| | | |
|---|---|---|
| DE | 102010014825 A1 | 10/2011 |
| EP | 0851164 A2 | 7/1998 |
| EP | 3628902 A1 | 4/2020 |
| WO | 2020064559 A1 | 4/2020 |

OTHER PUBLICATIONS

Written Opinion for International Application No. PCT/EP2022/051170 dated May 9, 2022.
English Translation of German Patent Application No. 10200900132A1 (Abstract).
English Translation of German Patent Application No. 102010014825 (Abstract).
English Translation of German Patent No. 19908899 (Abstract).
English Translation of International Search Report for International Application No. PCT/EP2022/051170 dated May 9, 2022.
English Translation of Written Opinion for International Application No. PCT/EP2022/051170 dated May 9, 2022.
International Search Report for International Application No. PCT/EP2022/051170 dated May 9, 2022.
1 Canadian Office Action for Canadian Application No. 3,207,644 dated Dec. 24, 2024.

* cited by examiner

METHOD FOR ACTUATING A SOLENOID VALVE WHICH IS USED FOR THROUGHFLOW RATE CONTROL OF AN AGRICULTURAL SPREADING MACHINE

RELATED APPLICATIONS

The present application claims priority under 35 U.S.C. § 119 to German Application No. 10 2021 101 335.6 filed on Jan. 22, 2021, and under 35 U.S.C. § 365 to International Application No. PCT/EP2022/051170 filed on Jan. 20, 2022. The entire contents of these applications are incorporated herein by reference in their entirety.

The disclosure relates to a method for actuating a solenoid valve which is used for throughflow rate control of an agricultural spreading machine according to the preamble of claim 1 and to a system for actuating a solenoid valve which is used for throughflow rate control of an agricultural spreading machine according to the preamble of claim 11.

Agricultural spreading machines, e.g. field sprayers, usually have currentless closed valves which have to be energized to cause an opening movement of the valve armature. The valve energizing generates a magnetic field which moves the valve armature into an open position in which the solenoid valve is open. To cause a closing movement of the valve armature in the direction of the valve seat, the energization process is interrupted again.

High demands are imposed on the solenoid valves of an agricultural spreading machine in terms of service life. A load spectrum of 270 million switching cycles can be defined for the solenoid valves installed in the sprayer boom. In this context, it is assumed that a field sprayer is used over a period of 6 years to process about 15,000 ha, wherein the solenoid valves are switched at a frequency of 25 Hz.

In practice, it has been found that the weak point limiting the service life of solenoid valves of agricultural spreading machines is usually the sealing area between the valve armature and the valve seat. In known solenoid valves, a circular surface at the front end region of the valve armature is sealed to an annular surface at the valve seat. In this case, a sealing nipple can be arranged on the valve armature, which impacts against the valve seat at high speed during each closing process. Since the sealing nipple on the valve armature and the valve seat are made from different materials, indentations, notches and other closing phenomena occur on both the sealing nipple and the valve seat.

The problem underlying the disclosure is thus to extend the service life of solenoid valves used for throughflow rate control on an agricultural spreading machine.

The problem is solved by a method of the type mentioned at the beginning, wherein within the scope of the method according to the disclosure a reduction of the movement speed of the valve armature is caused during the closing movement of the valve armature in the direction of the valve seat.

The disclosure takes advantage of the understanding that the wear of a solenoid valve used for throughflow rate control can be significantly reduced if the valve armature is actively braked shortly before it impacts the valve seat. The reduction in wear also means that the amount of spray fluid flowing through the solenoid valve when it is switched does not vary, or varies only insignificantly, over its service life. By reducing the movement speed of the valve armature during the closing movement, the valve armature impacts the valve seat with a lower movement speed, so that a smoother impact is achieved without significantly affecting the closing duration. The smoother impact reduces the shock load on the valve armature and the valve seat so that the service life of the solenoid valve is increased.

Energizing the solenoid valve to cause the opening movement of the valve armature preferably takes place in an opening phase. In the opening phase, the solenoid valve is preferably energized with an inrush current to cause the opening movement of the valve armature. The solenoid valve for holding the valve armature in an open position is preferably energized in a holding phase. In the holding phase, the solenoid valve is preferably energized with a holding current to hold the valve armature in the open position. Interrupting or changing the energization of the solenoid valve to cause the closing movement of the valve armature preferably takes place in a closing phase. To cause the closing movement of the solenoid valve, the energization of the solenoid valve with the inrush current and/or the holding current is preferably interrupted. The solenoid valve preferably has a coil via which a magnetic field can be generated to move the valve armature. The solenoid valve is preferably used for nozzle switching in the sprayer boom. The solenoid valve is preferably controlled by pulse width modulation (PWM). The PWM solenoid valve is preferably arranged directly upstream of a nozzle. Energizing the solenoid valve and interrupting or changing the energizing of the solenoid valve is preferably caused by a control unit of the agricultural spreading machine.

It is also preferred to use a method according to the disclosure in which the solenoid valve is energized to cause the reduction of the movement speed of the valve armature during the closing movement. In the closing phase, the solenoid valve is preferably energized with a braking current. By energizing the valve armature with the braking current during the closing movement, the valve armature is actively braked. By energizing the solenoid valve with the braking current during the closing movement of the valve armature, a magnetic field is generated which counteracts the closing movement of the valve armature, however does not interrupt the closing movement. The valve armature braking during the closing movement depends on the current intensity and the duration of the energization of the solenoid valve with the braking current during the closing movement of the valve armature.

Furthermore, the method according to the disclosure is preferably further developed in that the solenoid valve has a coil and the energization of the solenoid valve for holding the valve armature in the open position is pulse-width modulated, wherein the negative induction voltage of the coil is limited to a first voltage limit value when pulse width modulated energizing the solenoid valve to hold the valve armature in the open position and is limited to a second voltage limit value when interrupting or changing the energizing of the solenoid valve to cause the closing movement of the valve armature, wherein the magnitude of the second voltage limit value is greater than the magnitude of the first voltage limit value. The magnitude of the first voltage limit value can, for example, be 0.7 V and/or be specified by a free-wheeling diode. The magnitude of the second voltage limit value can, for example, correspond to at least the supply voltage. By increasing the allowable induction voltage when interrupting or changing the energization of the solenoid valve to cause the closing movement of the valve armature, the energy of the coil that was introduced into the coil to cause the opening movement of the valve armature and/or to hold the valve armature in an open position is quickly dissipated.

In another preferred embodiment of the method according to the disclosure, the solenoid valve has a return spring acting on the valve armature and the return spring causes or supports the closing movement of the valve armature. The force with which the valve armature impacts on the valve seat depends on the spring force of the return spring of the solenoid valve. The spring force of the return spring provides or supports the armature movement during the closing phase. Alternatively or additionally to the active braking of the valve armature during the closing movement by energizing the solenoid valve during the closing movement of the valve armature, a return spring can be used, the spring characteristic of which supports the braking process of the valve armature during the closing movement. The solenoid system of the solenoid valve is preferably single acting. In particular, there is no magnetized armature that brings polarization to close the solenoid valve magnetically. It is preferred that the solenoid valve is closed solely by the restoring force of the return spring. The magnetic forces that can be generated in the solenoid valve preferably counteract the restoring force of the return spring, irrespective of whether the voltage is positive or negative.

Furthermore, a method according to the disclosure is preferred, in which an expected contact time at which the valve armature comes into contact with the valve seat without a reduction in the movement speed of the valve armature during the closing movement is determined. Preferably, the determined expected time of contact is considered when reducing the movement speed of the valve armature during the closing movement. Determining the expected contact time can be done by calculation. When determining the expected contact time, it is therefore not mandatorily necessary to take into account an actual contact of the valve armature and valve seat. For example, the armature movement or the armature position is calculated within the scope of the calculation. The calculation of the expected contact time can also be based on a correlation relationship between the opening behavior and the closing behavior of the solenoid valve. For example, the time required to open the solenoid valve can be detected to calculate the time duration required to close the solenoid valve based on the time duration required to open the solenoid valve. To determine the time required to open the solenoid valve, the current during the opening phase can be analyzed. Based on the time required to close the solenoid valve, the time at which the valve armature comes into contact with the valve seat as a result of the closing movement can then be calculated. In this calculation, a correlation function or correlation table can be used that takes into account the fluid pressure and the properties of the return spring, from which the expected contact time during closing can be read. The determination of the expected time of contact is preferably carried out by a control unit of the agricultural spreading machine.

In a further preferred embodiment of the method according to the disclosure, an actual contact time is determined at which the valve armature comes into contact with the valve seat. Preferably, the determined actual contact time is taken into account when reducing the movement speed of the valve armature during a subsequent closing movement. Since the switching frequency of the solenoid valve is predefined, the determined actual contact time can be used to calculate a suitable energization time for braking the valve armature during the closing movement. The determination of the actual contact time is preferably carried out by a control unit of the agricultural spreading machine.

Furthermore, a method according to the disclosure is preferred in which the actual contact time is determined by evaluating the temporal development of the voltage applied to the solenoid valve. The voltage applied to the solenoid valve is thus detected as part of the method, so that the actual contact time can be determined via the detected temporal voltage development. The voltage detection can, for example, be carried out by means of scanning.

In another embodiment of the method according to the disclosure, evaluating the temporal development of the voltage applied to the solenoid valve comprises detecting a specific voltage change in the temporal development of the voltage applied to the solenoid valve. The specific voltage change from which it can be deduced that the valve armature has assumed the end position can be an inflection point, a specific curvature or a local extremum, in particular a minimum or a maximum, in the temporal voltage curve. The specific voltage change can also be an abrupt temporary drop or rise in the voltage applied to the solenoid valve.

In a further preferred embodiment of the method according to the disclosure, a contact time of another solenoid valve of the agricultural spreading machine is determined at which the valve armature of the other solenoid valve comes into contact with the valve seat of the other solenoid valve. Preferably, the determined contact time of the other solenoid valve is taken into account when reducing the movement speed of the valve armature during the closing movement. In particular, if the solenoid valves of the agricultural spreading machine are switched in a coordinated manner in a predetermined pattern, it is sufficient to determine the contact time at one solenoid valve so that, depending on this contact time and taking into account the coordinated switching behavior of the other solenoid valves, a suitable energization time of the other valves can be determined for braking the valve armature in the closing phase. Determining the contact time of the other solenoid valve is preferably carried out by a control unit of the agricultural spreading machine.

It is further preferred a method according to the disclosure, in which the reduction of the movement speed of the valve armature during the closing movement is suspended at least in one switching cycle and a delay-free contact time is determined at which the valve armature comes into contact with the valve seat during the at least one switching cycle. When determining the delay-free contact time, an actual contact of valve armature and valve seat is consequently taken into account. Preferably, the determined delay-free contact time is taken into account when reducing the movement speed of the valve armature during a subsequent closing movement. The determination of the delay-free contact time is preferably carried out by a control unit of the agricultural spreading machine.

The problem underlying the disclosure is further solved by a system of the type mentioned introductorily, wherein the control unit of the system according to the disclosure is set up to cause a reduction in the movement speed of the valve armature during the closing movement of the valve armature by a control intervention, in particular by causing energization of the solenoid valve. The system according to the disclosure is preferably adapted to carry out the method for actuating a solenoid valve used for throughflow rate control according to one of the embodiments described above. Thus, with respect to the advantages and modifications of the system according to the disclosure, reference is first made to the advantages and modifications of the method according to the disclosure.

In a preferred embodiment of the system according to the disclosure, the solenoid valve comprises a coil and the control unit is adapted to energize the solenoid valve in a pulse-width modulated manner to hold the valve armature in the open position and to limit the negative induction voltage of the coil to a first voltage limit value when energizing the solenoid valve in a pulse-width modulated manner to hold the valve armature in the open position and to a second voltage limit value when interrupting or changing the energization of the solenoid valve to cause the closing movement of the valve armature, wherein the magnitude of the second voltage limit value is greater than the magnitude of the first voltage limit value. By increasing the permissible induction voltage when interrupting or changing the energization of the solenoid valve to cause the closing movement of the valve armature, the energy of the coil, which was introduced into the coil to cause the opening movement of the valve armature and/or to hold the valve armature in an open position, is quickly dissipated.

In another preferred embodiment of the system according to the disclosure, the solenoid valve comprises a return spring acting on the valve armature. The return spring is preferably adapted to cause or assist the closing movement of the valve armature. The return spring may be a coil spring and may have a progressive, linear or degressive spring characteristic. The spring characteristic may have a buckling point. The return spring may be preloaded.

In a further preferred embodiment of the system according to the disclosure, the control unit is adapted to determine an expected contact time at which the valve armature comes into contact with the valve seat without a reduction in the movement speed of the valve armature during the closing movement. Additionally or alternatively, the control unit is adapted to determine an actual contact time at which the valve armature comes into contact with the valve seat. Alternatively or additionally, the control unit is set up to determine a contact time of another solenoid valve of the agricultural spreading machine at which the valve armature of the other solenoid valve comes into contact with the valve seat of the other solenoid valve. Alternatively or additionally, the control unit is adapted to determine a delay-free contact time at which the valve armature comes into contact with the valve seat during the at least one switching cycle in which the reduction of the movement speed of the valve armature is suspended during the closing movement. Preferably, the control unit is adapted to take into account the determined contact time to be expected, the determined actual contact time, the determined contact time of the other solenoid valve, and/or the determined delay-free contact time when reducing the movement speed of the valve armature during the closing movement. The control unit is preferably adapted to determine the actual contact time by evaluating the development over time of the voltage applied to the solenoid valve. The voltage applied to the solenoid valve can be determined by means of a scan. The control unit may further be adapted to detect a specific voltage change in the voltage applied to the solenoid valve in the course of time when evaluating the temporal development of the voltage applied to the solenoid valve.

In the following, a further method for actuating a solenoid valve of a sprayer boom of an agricultural spreading machine is described, which is independent of the previously mentioned aspects of the disclosure. Alternatively, the method may also realize individual ones of the previously mentioned aspects of the disclosure. The method for actuating the solenoid valve of the sprayer boom of the agricultural spreading machine comprises the steps:

impressing an inrush current on the solenoid valve of the agricultural spreading machine to cause a valve armature of the solenoid valve to move from a closed position to an open position; and impressing a holding current into the solenoid valve to hold the valve armature in the open position, wherein the holding current can be lower than the inrush current.

The method is preferably characterized in that the throughflow rate of spray fluid through the solenoid valve is effected by adjusting the fluid pressure of the spray fluid in a line section of the sprayer boom connected to the solenoid valve, meanwhile the valve armature is held in the open position by impressing the holding current.

In the closed position of the valve armature, the flow of spray fluid through the solenoid valve is blocked. In the open position of the valve armature, the flow of spray fluid through the solenoid valve is enabled.

Preferably, the valve armature is held constantly in the open position during the execution of parallel travel on a farmland by impressing the holding current, wherein the adjustment of the throughflow rate and thus also the adjustment of the spreading rate of spray fluid is carried out by changing the fluid pressure in the sprayer boom. During turning operations in the headland, the solenoid valve can be closed to prevent incorrect application of the spray fluid. The subsequent opening of the solenoid valve for the spreading process in the adjacent track is again performed by impressing an inrush current and keeping the solenoid valve open is again performed by impressing a holding current.

The throughflow rate of spray fluid through the solenoid valve can be increased by increasing the pressure in the line section of the sprayer boom connected to the solenoid valve. Furthermore, the throughflow rate of spray fluid through the solenoid valve can be reduced by reducing the pressure in the section of the sprayer boom connected to the solenoid valve.

In a preferred embodiment of the method according to the disclosure, an inrush voltage is applied to a solenoid coil of the solenoid valve to impress the inrush current into the solenoid valve. Preferably, a holding voltage is applied to the solenoid coil of the solenoid valve for impressing the holding current into the solenoid valve. The holding voltage is preferably lower than the inrush voltage.

In a preferred embodiment of the method according to the disclosure, the inrush current is impressed in the solenoid valve during an opening phase. The holding current is preferably impressed in the solenoid valve during a holding phase. The holding phase immediately follows the opening phase. The voltages for generating the currents can be constant or pulse width modulated (PWM).

In the following, preferred embodiments of the disclosure are explained and described in more detail with reference to the accompanying drawings. Therein:

Figure 4:
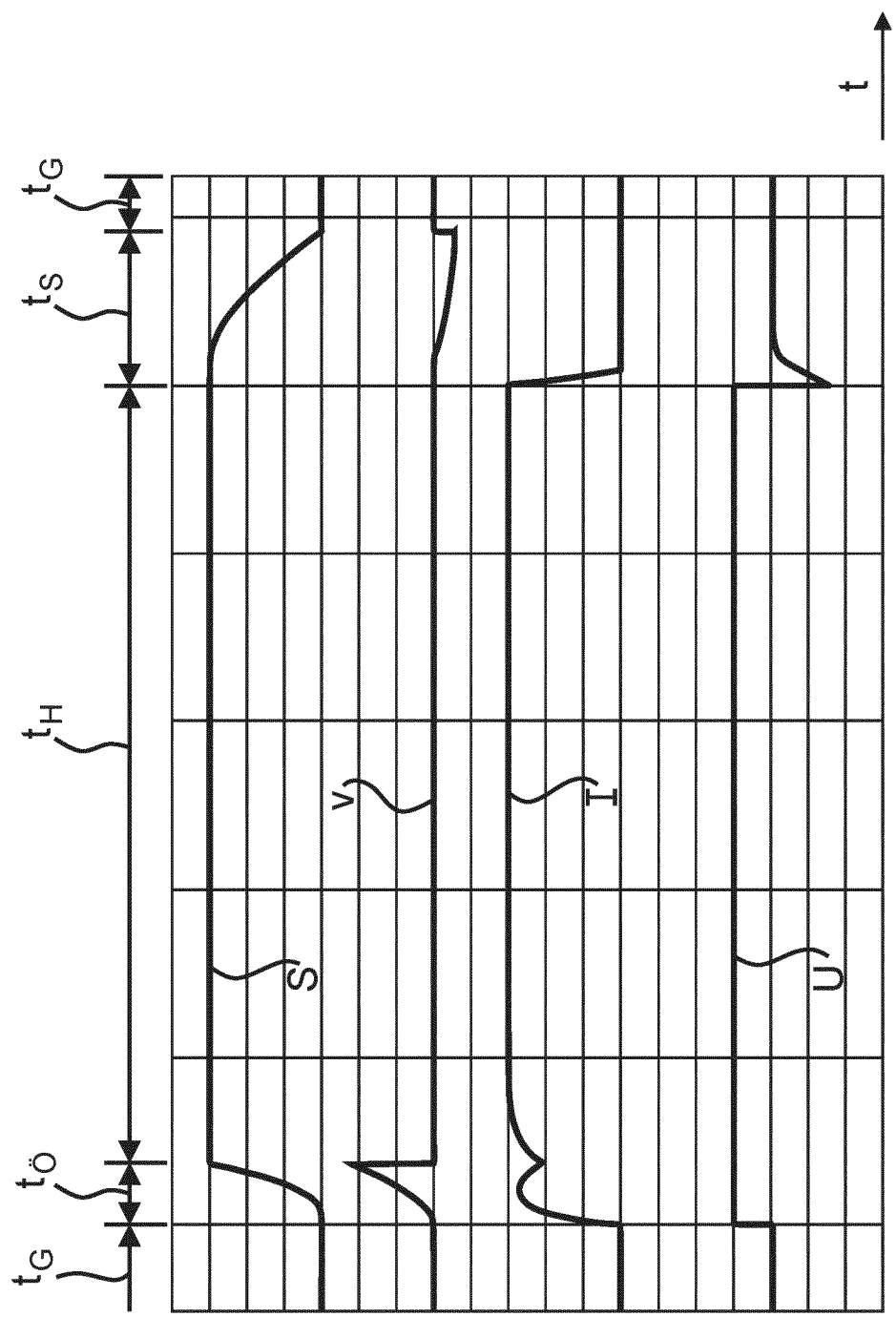
Figure 5:
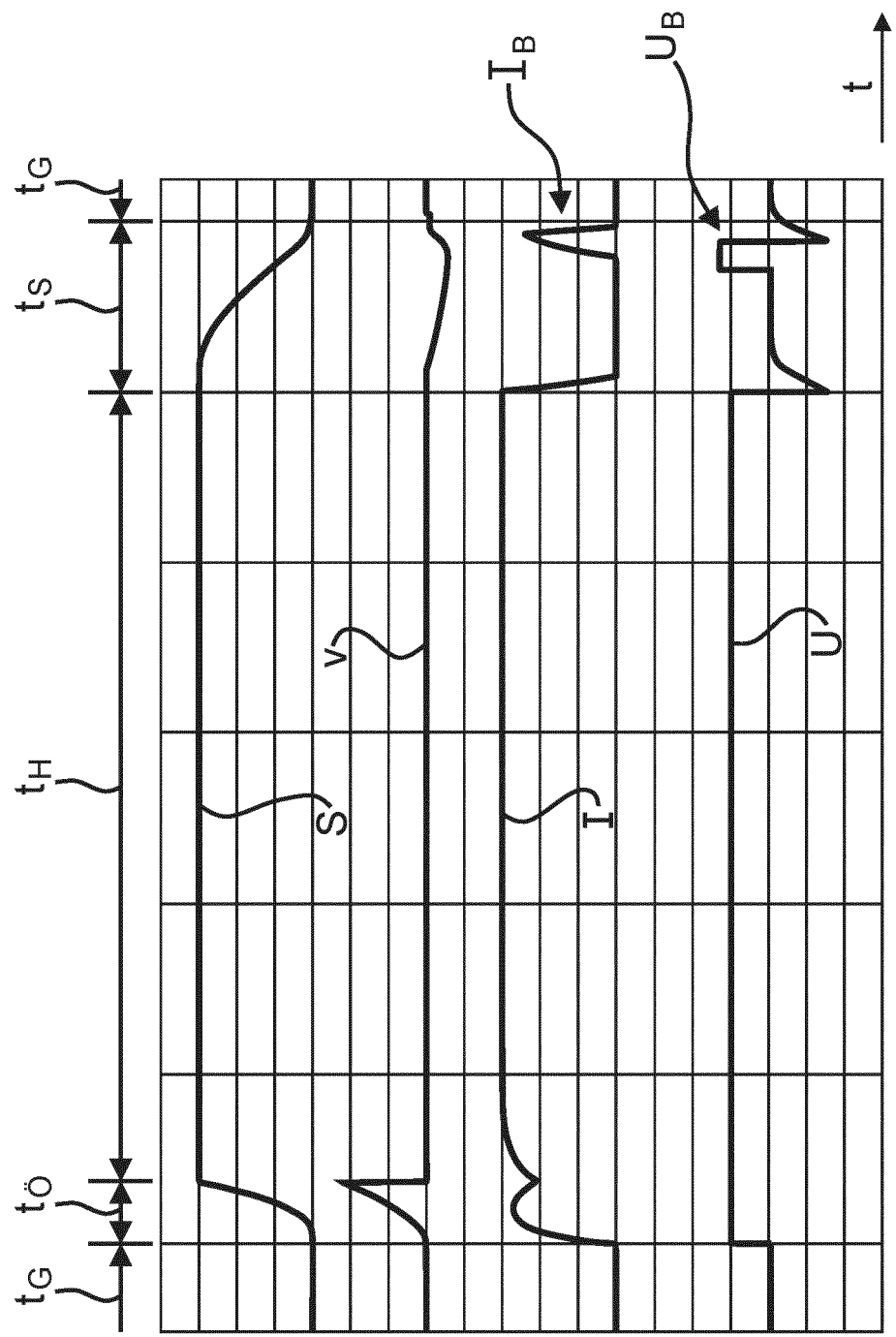

FIG. 4 shows the time characteristics of the voltage applied to a solenoid valve and the current flowing through the solenoid valve, as well as the resulting armature movement and armature speed without armature braking upstream of the valve seat; and FIG. 5 shows the time characteristics of the voltage applied to a solenoid valve and the current flowing through the solenoid valve, as well as the resulting armature movement and armature speed with armature braking upstream of the valve seat.

Figure 1:
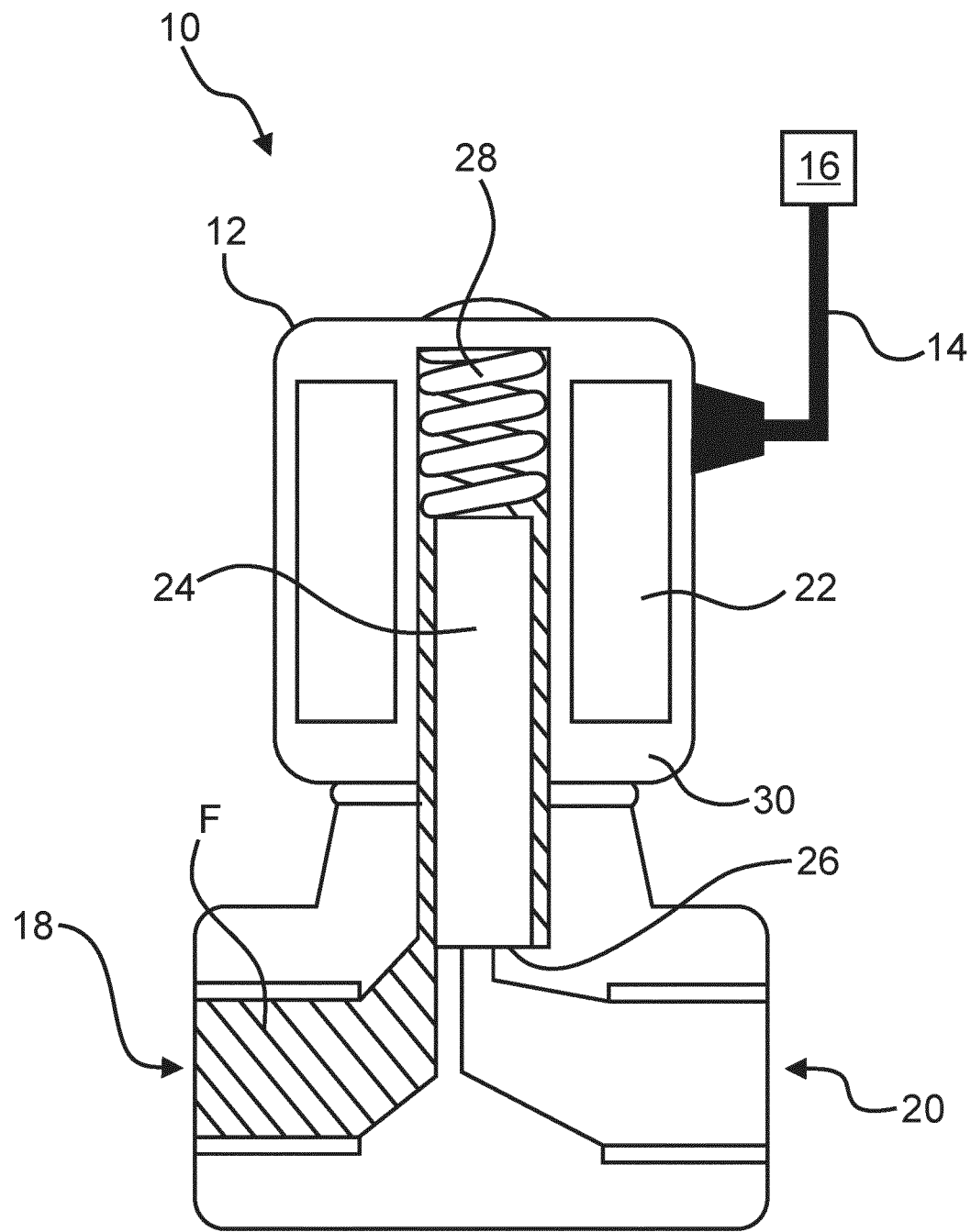
FIG. 1 shows a schematic view of a system according to the disclosure, wherein the valve armature of the solenoid valve is in a closed position.
Figure 2:
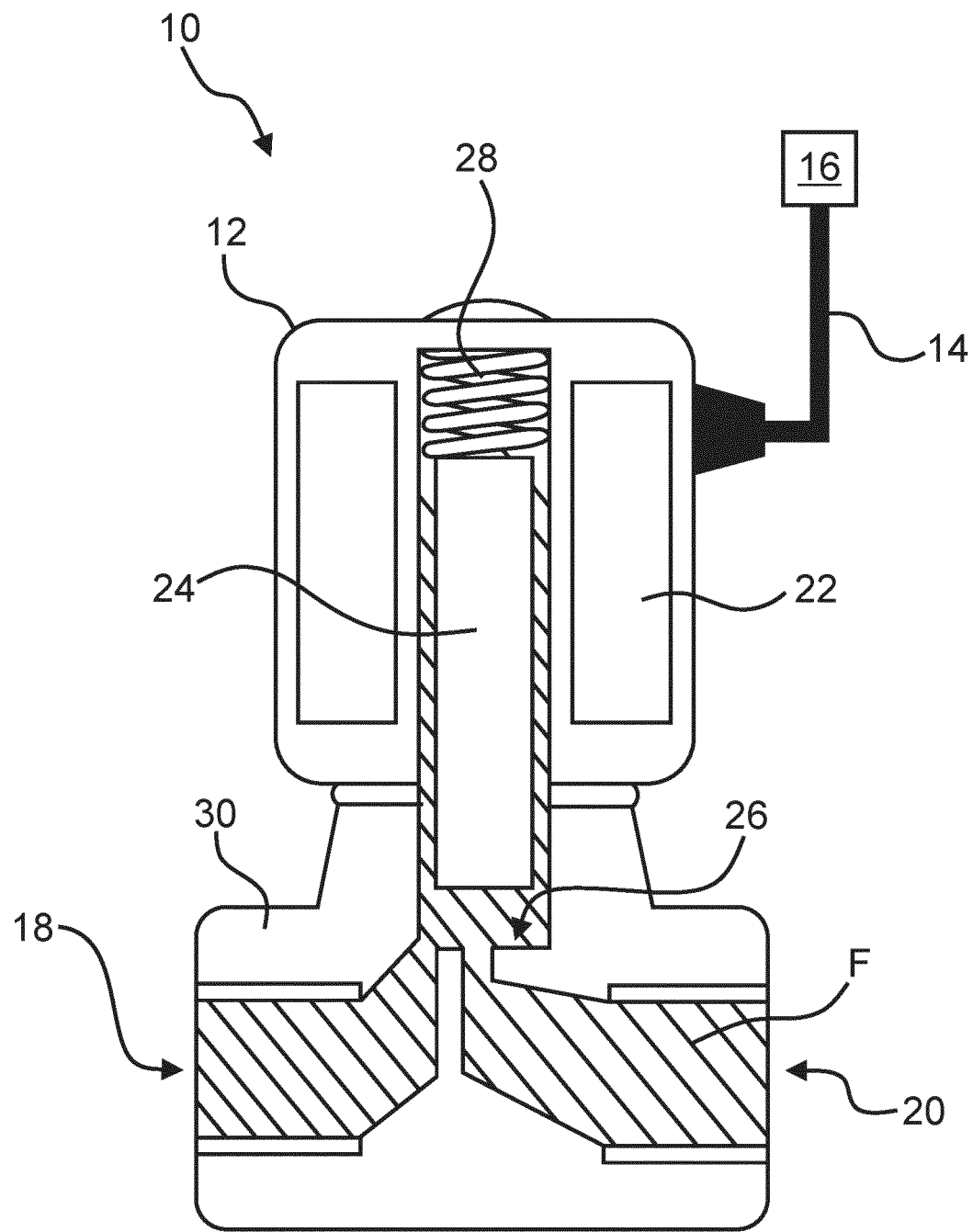
FIG. 2 shows a schematic view of the system illustrated in FIG. 1, wherein the valve armature of the solenoid valve is in an open position.
Figure 3:
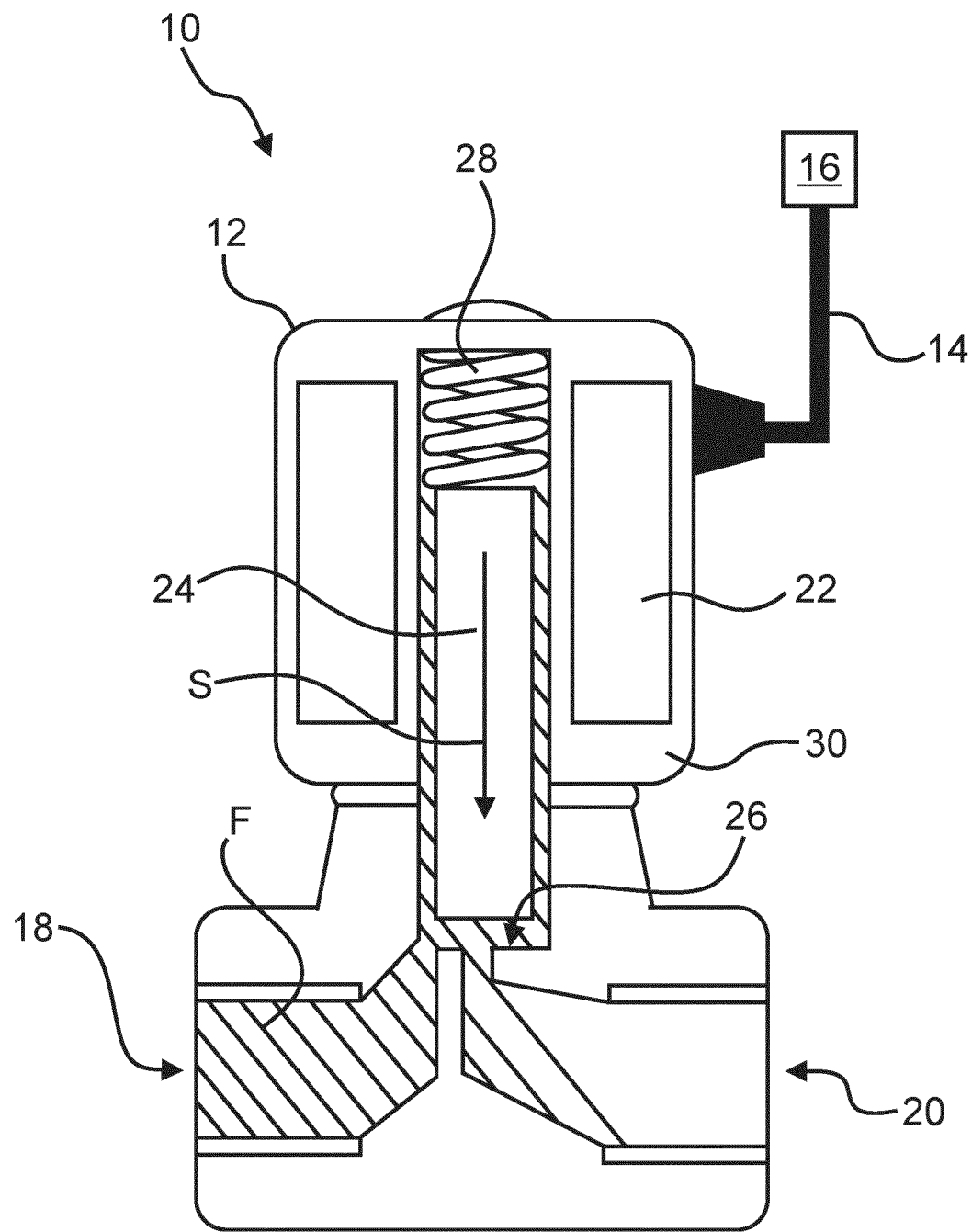
FIG. 3 shows a schematic view of the system illustrated in FIG. 1, wherein the valve armature of the solenoid valve carries out a closing movement.

FIGS. 1 to 3 show a system 10 for actuating a solenoid valve 12 used for throughflow rate control of an agricultural spreading machine, namely a field sprayer. The illustrated solenoid valve 12 is arranged in a fluid circuit of the agricultural spreading machine, wherein the solenoid valve 12 may be positioned immediately upstream of a nozzle. The nozzle and the solenoid valve 12 may form a valve-nozzle unit. A plurality of corresponding valve-nozzle units are arranged in the fluid circuit of the agricultural spreading machine, through which spray fluid F can be spread onto a farmland.

The solenoid valve 12 is connected to a control unit 16 of the system 10 via a line 14. The solenoid valve 12 can be opened and closed via the control unit 16.

The solenoid valve 12 has a fluid inlet 18 and a fluid outlet 20. In the passage between the fluid inlet 18 and the fluid outlet 20, there is a valve armature 24 which can be moved by a magnetic field generated by the coil 22. A return spring 28 is arranged at one front end of the valve armature 24, wherein the return spring 28 is supported on a portion of the housing 30 of the solenoid valve 12.

In the state shown in FIG. 1, the solenoid valve 12 is not energized so that the return spring 28 presses a front end of the valve armature 24 onto a valve seat 26 so that the passage between the fluid inlet 18 and the fluid outlet 20 is blocked.

Via the control unit 16, the solenoid valve 12 can be energized such that the magnetic field generated by the coil 22 causes an opening movement of the valve armature 24. To cause the opening movement, it is necessary that the magnetic field generated by the coil 22 applies an opening force to the valve armature 24 that is greater than the restoring force of the return spring 28.

FIG. 2 shows the solenoid valve 12 in an open state. Thus, by energizing the solenoid valve 12 with an inrush current, an opening movement of the valve armature 24 was caused. By energizing the solenoid valve 12 with a holding current, the valve armature 24 is held in an open position in which the solenoid valve 12 is open. In the open state of the solenoid valve 12, the passage between the fluid inlet 18 and the fluid outlet 20 is open so that spray fluid F can be spread via the nozzle positioned downstream of the solenoid valve 12.

FIG. 3 shows the system 10 after the energization of the solenoid valve 12 with the holding current to cause a closing movement S of the valve armature 24 in the direction of the valve seat 26 has been interrupted. The interruption of the energization dissolves the magnetic field of the coil 22 so that the return spring 28 moves the valve armature 24 in the direction of the valve seat 26.

To reduce wear on the solenoid valve 12, the valve armature 24 is actively braked shortly before it impacts the valve seat 26. The control unit 16 causes a reduction in the movement speed v of the valve armature 24 during the closing movement S, before the valve armature 24 reaches the valve seat 26. This is done by energizing the solenoid valve 12 during the closing movement S, so that a magnetic field is generated by the coil 22 which counteracts the closing movement S of the valve armature 24. However, the magnetic field generated by the coil 22 is not that strong so as to interrupt the closing movement S, but merely provides a braking of the valve armature 24 during the closing movement S. By reducing the movement speed v of the valve armature 24, the valve armature 24 impacts the valve seat 26 with a lower movement speed v, so that a smoother impact is achieved. The smoother impact reduces the shock load on the valve armature 24 and the valve seat 26, so that the service life of the solenoid valve 12 is increased.

FIG. 4 shows curves of the voltage U applied to a solenoid valve and the current I flowing through the solenoid valve as well as the resulting armature movement s and armature speed v over time t without the previously described braking of the valve armature 24 before reaching the valve seat 26. FIG. 5 shows corresponding voltage and current curves U, I as well as the resulting armature movement s and armature speed v when armature braking occurs before reaching the valve seat.

Both Figures show that energizing the solenoid valve 12 to cause the opening movement of the valve armature 24 occurs in an opening phase $t_O$. In the opening phase to, a voltage U is applied to the solenoid valve 12 so that current I is impressed in the solenoid valve 12. The magnetic field generated by the coil 22 causes the valve armature 24 to perform a movement along the armature travel s. The armature speed v increases during the opening phase $t_O$, since the valve armature 24 is increasingly accelerated during the opening movement. After reaching the end position, the solenoid valve 12 continues to be energized to hold the valve armature 24 in the open position in a holding phase $t_H$. During the opening movement, braking of the valve armature 24 can be caused so that the end position is more gently assumed by the valve armature 24 in the open state. The energization with the inrush current can, for example, be interrupted shortly before the end position is reached during the opening movement of the valve armature 24.

To close the solenoid valve 12, the energization of the solenoid valve 12 is interrupted so that the valve armature 24 performs a closing movement in a closing phase $t_S$. Due to an increase in the permissible induction voltage when the energization is interrupted, there is a quick energy reduction in the coil 22 and thus a rapid dissolution of the magnetic field. In the closing phase $t_S$, the valve armature 24 is accelerated by the return spring 28 until the valve armature 24 impacts the valve seat 26, thus completing the closing phase $t_S$. In the subsequent closed phase to, the valve armature 24 is in contact with the valve seat 26 so that no fluid can flow through the solenoid valve 12.

FIG. 5 shows the braking of the valve armature 24 in the closing phase $t_S$. In the closing phase $t_S$, a braking voltage $U_B$ is applied to the solenoid valve 12, so that a braking current $I_B$ is impressed. The magnetic field generated by the coil 22 ensures a reduction in the movement speed v of the valve armature 24 during the closing movement, before the valve armature 24 reaches the valve seat 26. In this way, the impact speed of the valve armature 24 on the valve seat 26 is reduced, which significantly increases the service life of the solenoid valve 12.

In order for the braking voltage UB to be applied to the solenoid valve 12 shortly before the valve armature 24 impacts the valve seat 26, the control unit 16 of the system 10 determines the expected contact time at which the valve armature 24 would come into contact with the valve seat 26 without a reduction in the movement speed V of the valve armature 24 during the closing movement S. Based on this contact time to be expected, the control unit 16 causes the application of the braking voltage UB sufficiently early so that an intended reduction of the armature speed v can be implemented before the valve armature 24 impacts the valve seat 26.

LIST OF REFERENCE SIGNS 10 system
12 solenoid valve
14 line
16 control unit
18 fluid inlet
20 fluid outlet
22 coil
24 valve armature
26 valve seat
28 return spring
30 housing
F spray fluid
I current
$I_B$ braking current
S closing movement
s armature movement
t time
$t_G$ closed phase
$t_O$ opening phase
$t_H$ holding phase
$t_S$ closing phase
U voltage
$U_B$ braking voltage
v armature speed

The invention claimed is:

1. A method for actuating a solenoid valve of an agricultural spreading machine which is used for throughflow rate control, wherein the solenoid valve has a valve armature, comprising:
energizing the solenoid valve in order to cause an opening movement of the valve armature or hold the valve armature in an open position in which the solenoid valve is open; and
interrupting or changing the energization of the solenoid valve in order to cause a closing movement of the valve armature in the direction of a valve seat; and
causing a reduction in the movement speed of the valve armature during the closing movement of the valve armature, wherein the solenoid valve has a coil and the energization of the solenoid valve for holding the valve armature in the open position is pulse-width modulated, wherein a negative induction voltage of the coil during pulse width modulated energization of the solenoid valve to hold the valve armature in the open position is limited to a first voltage limit value and during interruption or alteration of the energization of the solenoid valve to cause a closing movement of the valve armature is limited to a second voltage limit value, wherein the magnitude of the second voltage limit value is greater than the magnitude of the first voltage limit value.

2. The method according to claim 1, wherein the solenoid valve is energized to cause the movement speed of the valve armature to decrease during the closing movement of the valve armature.

3. The method according claim 1, wherein the solenoid valve has a return spring acting on the valve armature, and the return spring causes or supports the closing movement of the valve armature.

4. The method according to claim 1, further comprising:
determining an expected contact time at which the valve armature comes into contact with the valve seat without a reduction in the movement speed of the valve armature during the closing movement;
wherein the causing of the reduction in the movement speed of the valve armature during the closing movement is based on at least the determined contact time to be expected.

5. The method according to claim 1, further comprising:
determining an actual contact time at which the valve armature comes into contact with the valve seat;
wherein the causing of the reduction in the movement speed of the valve armature during a subsequent closing movement is based on at least a determined actual contact time.

6. The method according to claim 5, wherein the actual contact time is determined by evaluating a temporal development of a voltage applied to the solenoid valve.

7. The method according to claim 6, wherein evaluating the temporal development of the voltage applied to the solenoid valve comprises detecting a specific voltage change in the temporal development of the voltage applied to the solenoid valve.

8. The method according to claim 1, further comprising:
determining a contact time of another solenoid valve of the agricultural spreading machine at which the valve armature of the other solenoid valve comes into contact with the valve seat of the another solenoid valve;
wherein the causing of the reduction in the movement speed of the valve armature during the closing movement is based on at least the determined contact time of another solenoid valve.

9. The method according to claim 1, further comprising:
suspending the reduction of the movement speed of the valve armature during the closing movement in at least one switching cycle; and
determining a delay-free contact time at which the valve armature comes into contact with the valve seat during the at least one switching cycle;
wherein the causing of the reduction in the movement speed of the valve armature during a subsequent closing movement is based on at least the determined delay-free contact time.

10. A system for actuating a solenoid valve of an agricultural spreading machine used for throughflow rate control, the solenoid valve having a movable valve armature, comprising:
a control unit via which the solenoid valve can be energized to cause an opening movement of the valve armature and/or to hold the valve armature in an open position in which the solenoid valve is open;
wherein the control unit is adapted to cause the energization of the solenoid valve to be interrupted or changed to cause a closing movement of the valve armature in the direction of a valve seat; and
wherein the control unit is configured to cause a reduction in the movement speed of the valve armature during the closing movement of the valve armature by a control intervention, in particular by causing the solenoid valve to be energized, wherein the solenoid valve has a coil and the control unit is adapted to energize the solenoid valve in a pulse width modulated manner to hold the valve armature in the open position and to limit a negative induction voltage of the coil during energizing of the solenoid valve in a pulse-width-modulated manner to hold the valve armature in the open position to a first voltage limit value and during interruption or alteration of the energization of the solenoid valve to cause a closing movement of the valve armature to a second voltage limit value, wherein a magnitude of the second voltage limit value is greater than a magnitude of the first voltage limit value.

11. The system according to claim 10, wherein the solenoid valve comprises a return spring acting on the valve armature and the return spring is adapted to cause or support the closing movement of the valve armature.

12. The system according to claim 10, wherein the control unit is adapted,
- to determine an expected contact time to be expected at which the valve armature comes into contact with the valve seat without a reduction in the movement speed of the valve armature during the closing movement;
- to determine an actual contact time at which the valve armature comes into contact with the valve seat;
- to determine a contact time of another solenoid valve of the agricultural spreading machine at which the valve armature of the other solenoid valve comes into contact with the valve seat of the other solenoid valve; or
- to determine a delay-free contact time at which the valve armature comes into contact with the valve seat during at least one switching cycle in which the reduction of the movement speed of the valve armature is suspended during the closing movement;
- wherein the control unit is configured to cause a reduction in the movement speed of the valve armature during the closing movement based on at least one of: the determined expected contact time, the determined actual contact time, the determined contact time of the other solenoid valve and the determined delay-free contact time.

* * * * *